(12) United States Patent
Yang et al.

(10) Patent No.: US 8,810,943 B2
(45) Date of Patent: Aug. 19, 2014

(54) SYNC MARK DETECTION USING BRANCH METRICS FROM DATA DETECTOR

(71) Applicant: LSI Corporation, Milpitas, CA (US)

(72) Inventors: Shaohua Yang, San Jose, CA (US); Yoon L. Liow, San Jose, CA (US); Wu Chang, Sunnyvale, CA (US); Xuebin Wu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/728,443

(22) Filed: Dec. 27, 2012

(65) Prior Publication Data

US 2014/0185159 A1  Jul. 3, 2014

(51) Int. Cl.
*G11B 5/09* (2006.01)
(52) U.S. Cl.
USPC .................. 360/51; 360/40; 360/39; 360/55; 360/70

(58) Field of Classification Search
None
See application file for complete search history.

(56) References Cited

U.S. PATENT DOCUMENTS

| 7,561,649 | B2 | 7/2009 | Ashley et al. | |
|---|---|---|---|---|
| 8,027,114 | B1 * | 9/2011 | Han et al. | 360/51 |
| 2012/0124241 | A1 | 5/2012 | Yang et al. | |

* cited by examiner

*Primary Examiner* — Muhammad N Edun
(74) *Attorney, Agent, or Firm* — Ryan, Mason & Lewis, LLP

(57) ABSTRACT

Methods and apparatus are provided for detecting a sync mark in a storage system, such as a hard disk drive. A sync mark is detected in a storage system by obtaining one or more branch metrics from a data detector in the storage system; generating one or more sync mark metrics using the one or more branch metrics from the data detector; and identifying the sync mark based on the sync mark metrics. An input data set is optionally compared with a plurality of portions of a sync mark pattern to yield corresponding comparison values and the comparison values can be summed to obtain at least one result. A sync mark found signal is asserted based upon the at least one result.

9 Claims, 4 Drawing Sheets

SYNC MARK DETECTION USING BRANCH METRICS FROM DATA DETECTOR

BACKGROUND

Storage systems often identify the starting position of recorded data using a synchronization mark (Sync mark) pattern. A sync mark location detector typically searches for the sync mark within a window. Once the sync mark is identified, the sync mark location detector can determine where the data section is located within the recording track.

Various circuits have been proposed or suggested to identify sync marks within a data stream. For example, a sync mark may be identified by computing a metric, such as a Euclidean distance metric, for multiple positions within a sync mark search window and comparing the computed metrics to a sync mark metric threshold value. When the Euclidean distance is less than the threshold value, a sync mark is said to have been found. In some cases, a sync mark may be improperly indicated or a sync mark may be missed due to noise. The Euclidean metric computation module, however, requires a significant amount of the circuit area in the sync mark detector.

A need therefore exists for improved techniques for detecting a sync mark in a storage system.

SUMMARY OF THE INVENTION

Generally, methods and apparatus are provided for detecting a sync mark in a storage system, such as a hard disk drive. According to one aspect of the invention, at least one sync mark is detected in a storage system by obtaining one or more branch metrics from a data detector in the storage system; generating one or more sync mark metrics using the one or more branch metrics from the data detector; and identifying the sync mark based on the sync mark metrics. An input data set is optionally compared with a plurality of portions of a sync mark pattern to yield corresponding comparison values and the comparison values can be summed to obtain at least one result. A sync mark found signal is asserted based upon the at least one result.

A more complete understanding of the present invention, as well as further features and advantages of the present invention, will be obtained by reference to the following detailed description and drawings.

DETAILED DESCRIPTION

The present invention provides improved techniques for sync mark detection. According to one embodiment of the invention, branch metrics computed by a data detector in the digital front end are re-used by the sync mark detector to generate sync mark metrics, such as Euclidean metrics, that identify the sync mark location. In this manner, a dedicated Euclidean metric computation module is not required in the sync mark detector.

Figure 1:
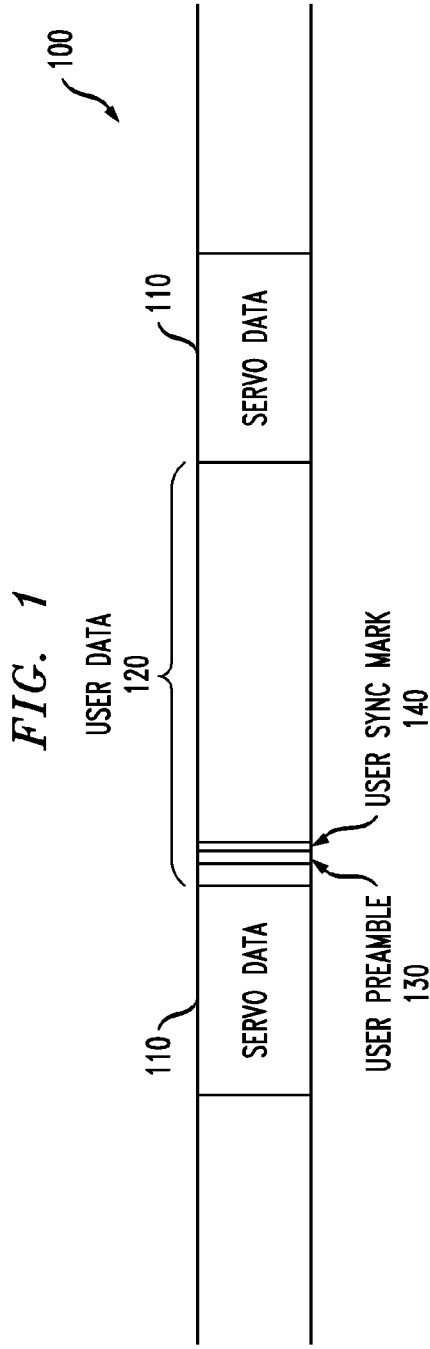
FIG. 1 illustrates an exemplary recording format for storage systems, such as disk drives.

FIG. 1 illustrates an exemplary recording format 100 for storage systems, such as disk drives. As shown in FIG. 1, the exemplary recording format 100 comprises alternating regions of servo data 110 and user data 120. A region of user data 120 may include one or more sets of data that are stored to a storage medium. The data sets may include user synchronization information some of which may be used as a mark to establish a point of reference from which processing of the data within user data region 120 may begin processing. Once the user data region is reached, a user sync mark 140 is detected and used as a reference point from which data processing is performed. User sync mark 140 is preceded by a user preamble 130. As used herein, the phrase "sync mark" is used in its broadest sense to mean any pattern that may be used to establish a point of reference.

Figure 2:
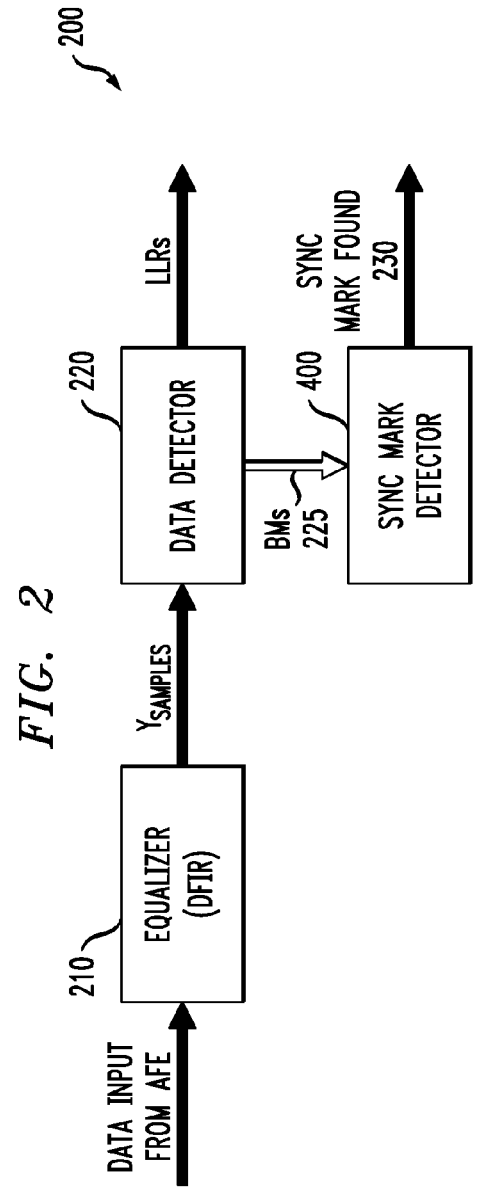
FIG. 2 is a block diagram of a portion of a digital front end (DFE) according to one embodiment of the invention.

FIG. 2 is a block diagram of a portion 200 of a digital front end (DFE) according to an exemplary embodiment of the invention. As shown in FIG. 2, the exemplary DFE portion 200 comprises an equalizer circuit 210 that receives a data input from an analog front end (AFE) and provides an equalized output comprised of Y samples, in a known manner. In some embodiments, equalizer circuit 210 is a digital finite impulse response filter as are known in the art. The data input from the AFE may be a series of digital samples. The digital samples may represent, for example, data stored on a storage medium or data received via a wireless communication medium.

As shown in FIG. 2, the Y samples generated by the equalizer circuit 210 are applied to a data detector 220 that calculates branch metrics (BMs) 225 in the generation of log likelihood ratios (LLRs) for maximum-likelihood detection. Generally, branch metrics are 225 normalized distances between every possible symbol in the code alphabet and the received symbol.

As previously indicated, the branch metrics 225 computed by the data detector 220 in the digital front end 200 are re-used by a sync mark detector 400, as discussed further below in conjunction with FIG. 4, to obtain sync mark metrics (such as those discussed below in conjunction with FIG. 3). In this manner, a dedicated Euclidean metric computation module is not required in the sync mark detector 400. When the sync mark 140 is detected by the sync mark detector 400, the sync mark detector 400 asserts a Sync Mark Found output 230 (which is used to align Y samples).

It is noted that the data detector 220 computes branch metrics 225 for all possible data patterns. For an exemplary 16 state data detector 220, the data detector 220 computes the Euclidean metrics for all 32 branches. The sync mark pattern, however, typically does not contain one bit transitions (to provide a higher signal-to-noise (SNR) ratio). Thus, in one exemplary embodiment, the sync mark detector 400 only needs those branches that do not have single bit transitions.

Figure 3:
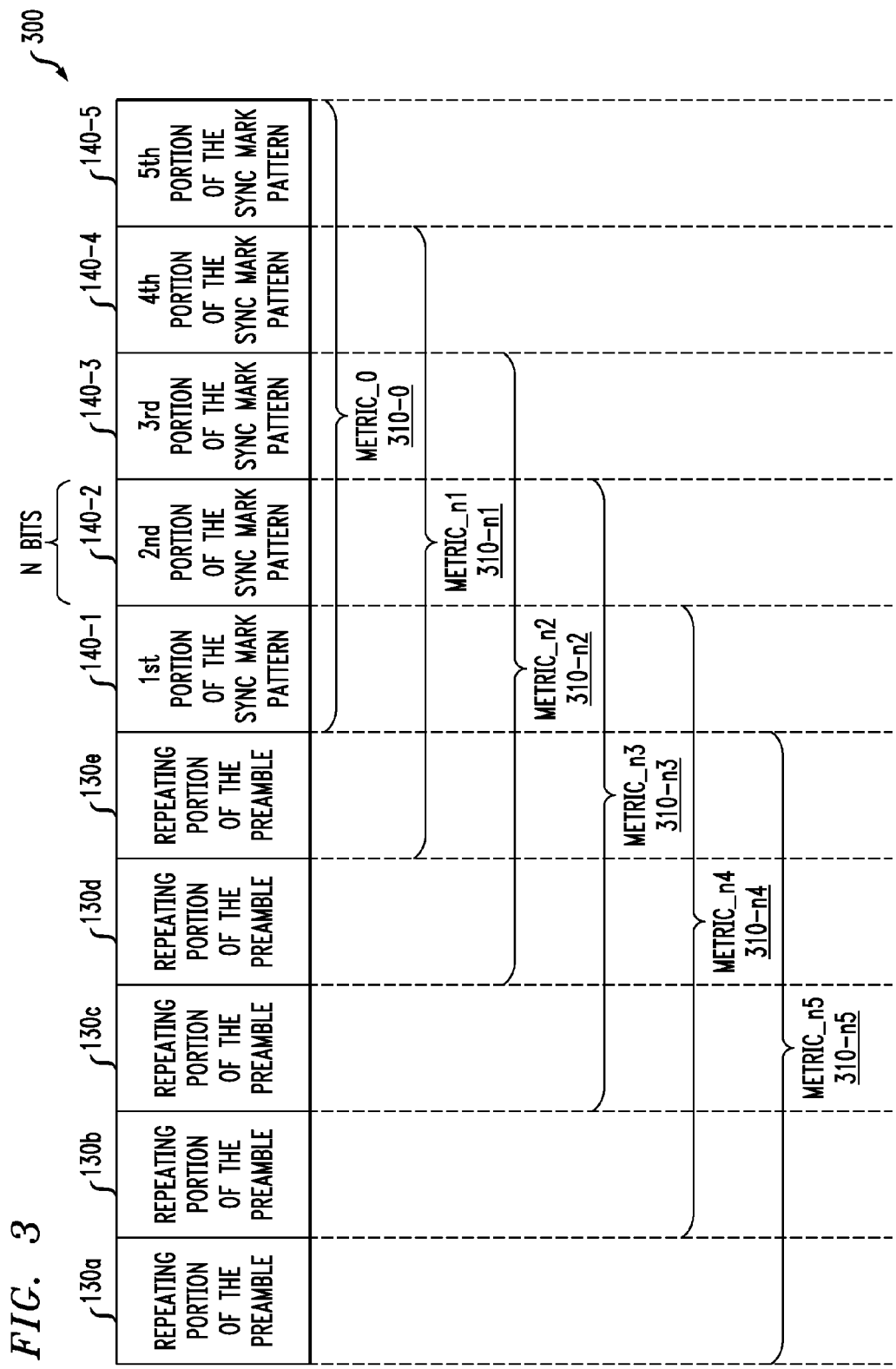
FIG. 3 illustrates a number of metrics that are used to perform sync mark pattern matching in the sync mark detector circuit of FIG. 4.
Figure 4:
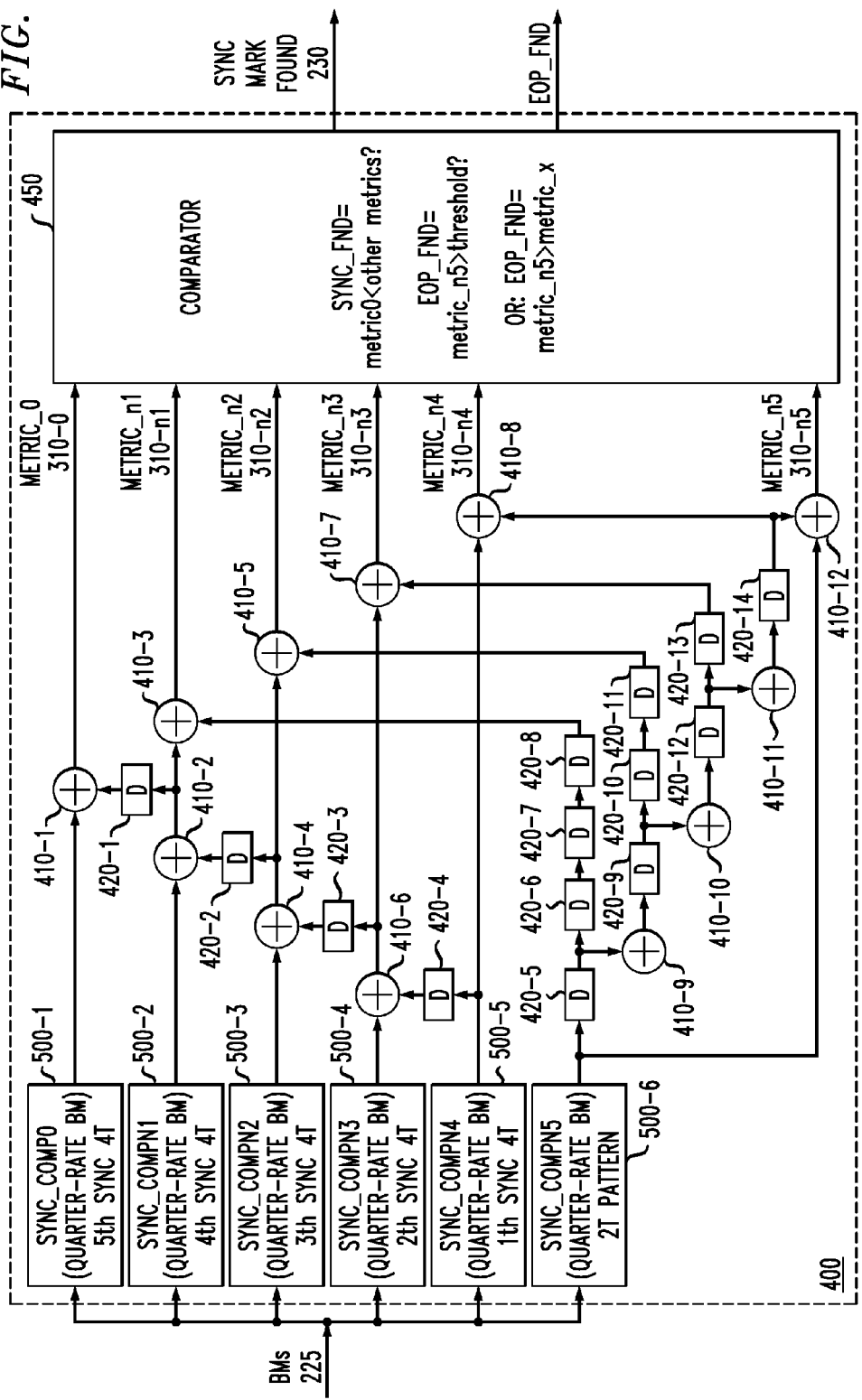
FIG. 4 illustrates the sync mark detector circuit of FIG. 2 in further detail.

FIG. 3 illustrates a number of metrics 310 that are used to perform sync mark pattern matching in the sync mark detector circuit of FIG. 4. In particular, a time line 300 shows N-bit preamble pattern 130 repeated a number of times (i.e., elements 130a, 130b, 130c, 130d, 130e) and a number of different N-bit portions (i.e., elements 140-1, 140-2, 140-3, 140-4, 140-5) of sync mark pattern 140 lined up in time as they would be expected to be received as part of an incoming data stream. A typical value of N is 4.

As shown in FIG. 3, metric_0 (310-0) corresponds to a comparison (e.g., a Euclidean difference) between an output of equalizer 210 and the five consecutive N-bit portions 140-

1, 140-2, 140-3, 140-4, 140-5 of sync mark pattern 140. Thus, Metric_0 describes the metric for the 20 bit sync mark 140 and the 4 bit preamble 130.

Metric_n1 (310-n1) corresponds to a comparison (e.g., a Euclidean difference) between an output of equalizer 210 and one N-bit portion of the preamble 130e appended with the four least recent N-bit portions 140-1, 140-2, 140-3, 140-4 of sync mark pattern 140. Thus, Metric_n1 describes the metric for 16 bits of the sync mark 140 and 8 bits of the repeated preamble 130.

Metric_n2 (310-n2) corresponds to a comparison (e.g., a Euclidean difference) between an output of equalizer 210 and two N-bit portions of the preamble 130d, 130e appended with the three least recent N-bit portions 140-1, 140-2, 140-3 of sync mark pattern 140. Thus, Metric_n2 describes the metric for 12 bits of the sync mark 140 and 12 bits of the repeated preamble 130.

Metric_n3 (310-n3) corresponds to a comparison (e.g., a Euclidean difference) between an output of equalizer 210 and three N-bit portions of the preamble 130c, 130d, 130e appended with the two least recent N-bit portions 140-1, 140-2 of sync mark pattern 140. Thus, Metric_n3 describes the metric for 8 bits of the sync mark 140 and 16 bits of the repeated preamble 130.

Metric_n4 (310-n4) corresponds to a comparison (e.g., a Euclidean difference) between an output of equalizer 210 and four N-bit portions of the preamble 130b, 130c, 130d, 130e appended with the least recent N-bit portion 140-1 of sync mark pattern 140. Thus, Metric_n4 describes the metric for 4 bits of the sync mark 140 and 20 bits of the repeated preamble 130.

Metric_n5 (310-n5) corresponds to a comparison (e.g., a Euclidean difference) between an output of equalizer 210 and five N-bit portions of the preamble 130a, 130b, 130c, 130d, 130e. Thus, Metric_n5 describes the metric for 0 bits of the sync mark 140 and 24 bits of the repeated preamble 130.

It is noted that the metrics 310 of FIG. 3 are updated once every N-bit or 1/N clock cycle.

In one particular embodiment of the present invention where the comparisons performed to determine the metrics 310 of FIG. 3 are calculations of the Euclidean distance from a defined pattern to an input data set, the values of the aforementioned inputs are each lower when the respective patterns are closer to matching. In such a case, the Sync Mark Found output 230 of FIG. 2 is asserted whenever the value provided as metric_0 (310-0) is less than any of the values provided as metric_n1 (310-n1), metric_n2 (310-n2), metric_n3 (310-n3), metric_n4 (310-n4) and metric_n5 (310-n5).

FIG. 4 illustrates an exemplary sync mark detector circuit 400 of FIG. 2 in further detail. As shown in FIG. 4, the exemplary sync mark detector circuit 400 comprises a plurality of segment metric computation modules 500-1 through 500-6, as discussed further below in conjunction with FIG. 5. As discussed further below, each segment metric computation module 500 processes the branch metrics 225 generated by the data detector 200 associated with those branches that do not have single bit transitions.

The exemplary sync mark detector circuit 400 includes a first segment metric computation module 500-1 that receives branch metric samples 225 and computes a segment metric for the least significant 4T branch metrics 225 (fifth sync 4T cycle—4 bits); a second segment metric computation module 500-2 that receives branch metric samples 225 and computes a segment metric for the next least significant 4T branch metrics 225 (fourth sync 4T cycle—4 bits); a third segment metric computation module 500-3 that receives branch metric samples 225 and computes a segment metric for the next least significant 4T branch metrics 225 (third sync 4T cycle—4 bits); a fourth segment metric computation module 500-4 that receives branch metric samples 225 and computes a segment metric for the next least significant 4T branch metrics 225 (second sync 4T cycle—4 bits); a fifth segment metric computation module 500-5 that receives branch metric samples 225 and computes a segment metric for the next least significant 4T branch metrics 225 (first sync 4T cycle—4 bits) and a sixth segment metric computation module 500-6 that receives branch metric samples 225 and computes a segment metric for the next least significant 2T branch metrics 225 (2T cycle in preamble 130).

Generally, the segment metric computation modules 500-1 through 500-5 compare the branch metrics with the corresponding portion of the sync mark pattern 140. The segment metric computation module 500-6 compares the branch metrics with the repeating preamble pattern 130.

As shown in FIG. 4, the sync mark detector 400 of FIG. 4 computes the metrics 310 of FIG. 3, as follows:

Metric_0($t$) (310-0)=sync_comp0($t$)+sync_compn1($t$-1)+syncompn2($t$-2)+sync_compn3($t$-3)+sync_compn4($t$-4)+sync_compn5($t$-5);

Metric_n1($t$) (310-n1)=sync_compn1($t$)+sync_compn2($t$-1)+syncompn3($t$-2)+sync_compn4($t$-3)+sync_compn5($t$-4)+sync_compn5($t$-5);

Metric_n2($t$) (310-n2)=sync_compn2($t$)+sync_compn3($t$-1)+syncompn4($t$-2)+sync_compn5($t$-3)+sync_compn5($t$-4)+sync_compn5($t$-5);

Metric_n3($t$) (310-n3)=sync_compn3($t$)+sync_compn4($t$-1)+syncompn5($t$-2)+sync_compn5($t$-3)+sync_compn5($t$-4)+sync_compn5($t$-5);

Metric_n4($t$) (310-n4)=sync_compn4($t$)+sync_compn5($t$-1)+syncompn5($t$-2)+sync_compn5($t$-3)+sync_compn5($t$-4)+sync_compn5($t$-5); and Metric_n5($t$) (310-n5)=sync_compn5($t$)+sync_compn5($t$-1)+syncompn5($t$-2)+sync_compn5($t$-3)+sync_compn5($t$-4)+sync_compn5($t$-5).

Thus, to implement the above equations, the sync mark detector 400 comprises a plurality of adders 410 to implement the addition operations of the above equations and delay elements 420 to generate the delayed sync_comp (t-n) values, as shown in FIG. 4.

In addition, the sync mark detector 400 includes a comparator 450 for comparing the various metrics 310. As indicated above, the Sync Mark Found output 230 of FIG. 2 is asserted whenever the value provided as metric_0 (310-0) is less than any of the values provided as metric_n1 (310-n1), metric_n2 (310-n2), metric_n3 (310-n3), metric_n4 (310-n4) and metric_n5 (310-n5).

In addition, the comparator 450 controls an end-of-preamble (EOP) signal that indicates when an end-of-preamble (2T Patterns) is detected. In one exemplary embodiment, an end-of-preamble is detected if the metric_n5 exceeds a predefined (metric_x). It is noted that the metric_n5 is matched to the 2T pattern (11001100).

Figure 5:
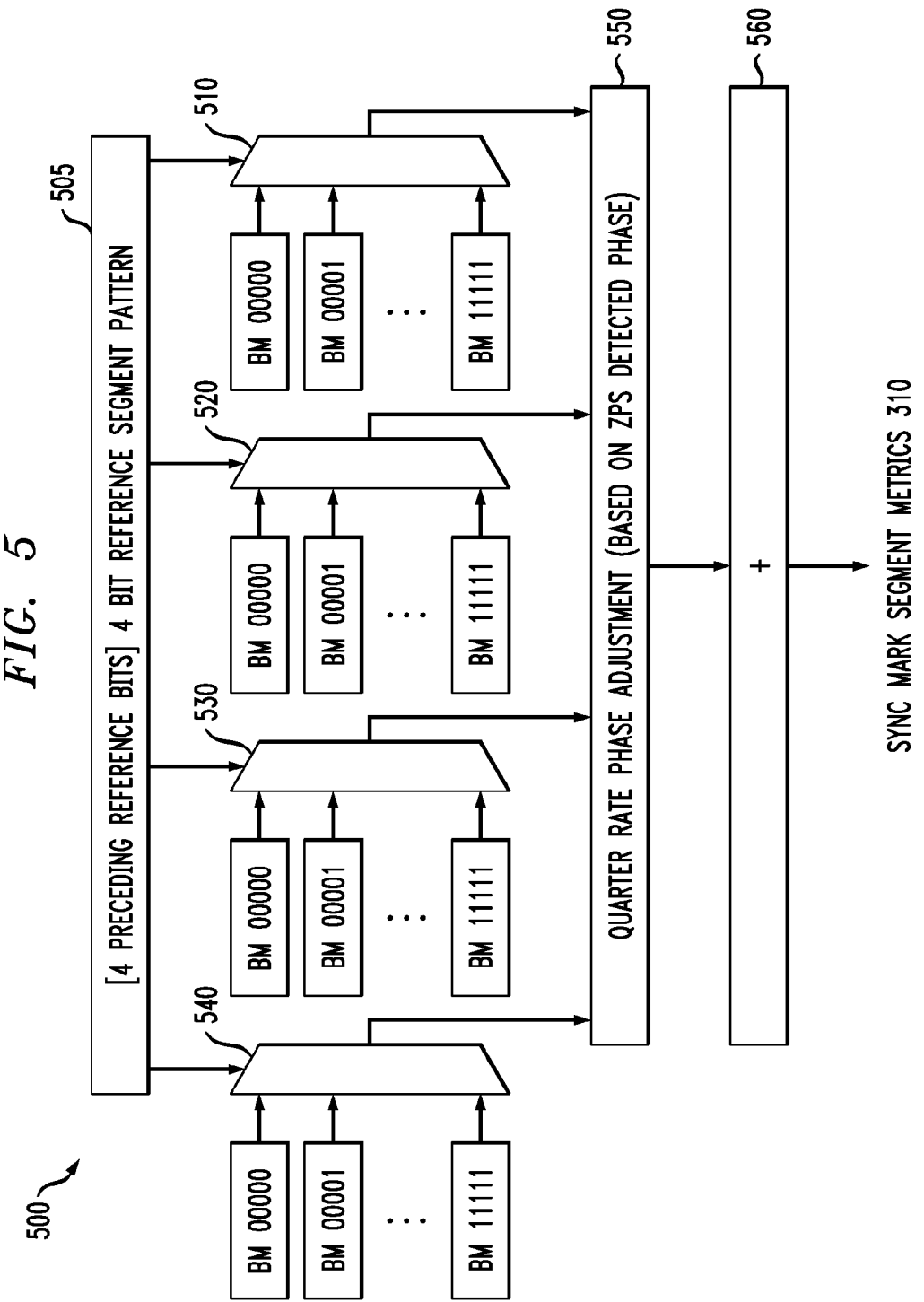
FIG. 5 illustrates the segment metric computation modules of FIG. 4 in further detail.

FIG. 5 illustrates the segment metric computation modules 500 of FIG. 4 in further detail. As indicated above, in one exemplary embodiment, each segment metric computation module 500 processes the branch metrics 225 generated by the data detector 200 associated with those branches that do not have single bit transitions (since the sync mark pattern does not contain single bit transitions).

Generally, the segment metric computation modules 500-1 through 500-5 compare the branch metrics 225 with the corresponding portion of the sync mark pattern 140. The segment metric computation module 500-6 compares the branch metrics with the repeating preamble pattern 130.

As shown in FIG. 5, the segment metric computation modules 500 receive the branch metrics 225 and a set of bits 505 comprised of the 4 bit reference segment pattern (e.g., 140-5 of FIG. 3) and the 4 preceding reference bits (e.g., 140-4 of FIG. 3). A sub-set of the input bits 505 are applied to a first multiplexer 510 corresponding to the 5 newest bits (the 4 bit reference pattern and 1 preceding bit). A sub-set of the input bits 505 are applied to a second multiplexer 520 corresponding to the second 5 newest bits (3 bits of the reference pattern and 2 preceding bits). A sub-set of the input bits 505 are applied to a third multiplexer 530 corresponding to the third 5 newest bits (2 bits of the reference pattern and 3 preceding bits). A sub-set of the input bits 505 are applied to a fourth multiplexer 540 corresponding to the fourth 5 newest bits (2 bits of the reference pattern and 3 preceding bits).

In addition, the branch metrics 225 in FIG. 5 correspond to the 32 branch metrics for time t for a trellis corresponding to the 5 bits applied to the corresponding multiplexer 510, 520, 530, 540. The branch metrics 225 correspond to four different sets of 32 values (excluding single transition branch metric values), with one branch metric set applied to each multiplexer 510, 520, 530, 540.

A quarter rate phase adjustment is applied at stage 550. It is noted that each clock cycle processes four trellis sections. The segment metric computation modules 500 thus only need to operate at a quarter rate.

The various values are summed at stage 560 to generate the metrics 310 of FIG. 3.

For a more detailed discussion of the sync mark detector 400 of FIG. 4 and the various metrics 310 described herein, see, for example, United States Patent Publication No. 2012/0124241, entitled "Systems and Method for Sync Mark Detection," incorporated by reference herein.

CONCLUSION

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for detecting at least one sync mark in a storage system, comprising:
   obtaining one or more branch metrics from a data detector in said storage system;
   generating one or more sync mark metrics using said one or more branch metrics from said data detector;
   identifying said sync mark based on said sync mark metrics
   receiving an input data set;
   comparing the input data set with a plurality of portions of a sync mark pattern to yield corresponding comparison values;
   summing said comparison values to obtain at least one result; and
   asserting a sync mark found signal based upon said at least one result.

2. The method of claim 1, wherein said step of comparing the input data set with a plurality of portions of a sync mark pattern further comprises calculating a Euclidean distance between the input data set and said portions of said sync mark pattern.

3. The method of claim 1, wherein said sync mark found signal indicates that a sync mark was found when at least one result is less than a second result.

4. A sync mark detector, comprising:
   a plurality of segment metric computation modules for generating a plurality of sync mark metrics using one or more branch metrics obtained from a data detector;
   a comparator for comparing said plurality of sync mark metrics to identify said sync mark based on said sync mark metrics;
   a comparator for comparing an input data set with a plurality of portions of a sync mark pattern to yield corresponding comparison values;
   an adder for summing said comparison values to obtain at least one result; and
   means for asserting a sync mark found signal based upon said at least one result.

5. The sync mark detector of claim 4, wherein said comparison of the input data set with a plurality of portions of a sync mark pattern further comprises calculating a Euclidean distance between the input data set and said portions of said sync mark pattern.

6. The sync mark detector of claim 4, wherein said sync mark found signal indicates that a sync mark was found when at least one result is less than a second result.

7. A digital front end for a storage system, comprising:
   a data detector for generating one or more branch metrics;
   a sync mark detector for generating one or more sync mark metrics using said one or more branch metrics from said data detector and identifying said sync mark based on said sync mark metrics;
   a comparator for comparing an input data set with a plurality of portions of a sync mark pattern to yield corresponding comparison values;
   an adder for summing said comparison values to obtain at least one result; and
   means for asserting a sync mark found signal based upon said at least one result.

8. The digital front end for a storage system of claim 7, wherein said comparison of the input data set with a plurality of portions of a sync mark pattern further comprises calculating a Euclidean distance between the input data set and said portions of said sync mark pattern.

9. The digital front end for a storage system of claim 7, wherein said sync mark found signal indicates that a sync mark was found when at least one result is less than a second result.

* * * * *